L. S. CHICHESTER.

Meat and Vegetable Cutter.

No. 29,766.  Patented Aug. 28, 1860.

Witnesses  Inventor
Lewis S. Chichester

UNITED STATES PATENT OFFICE.

LEWIS S. CHICHESTER, OF NEW YORK, N. Y.

MEAT AND VEGETABLE CHOPPER.

Specification of Letters Patent No. 29,766, dated August 28, 1860.

*To all whom it may concern:*

Be it known that I, LEWIS S. CHICHESTER, of the city, county, and State of New York, have invented a new and Improved Implement or Device for Chopping Meat and Vegetables; and I do hereby declare that the following is a full, clear, and exact description of the same, reference being had to the accompanying drawings, making a part of this specification, in which—

Figure 1:
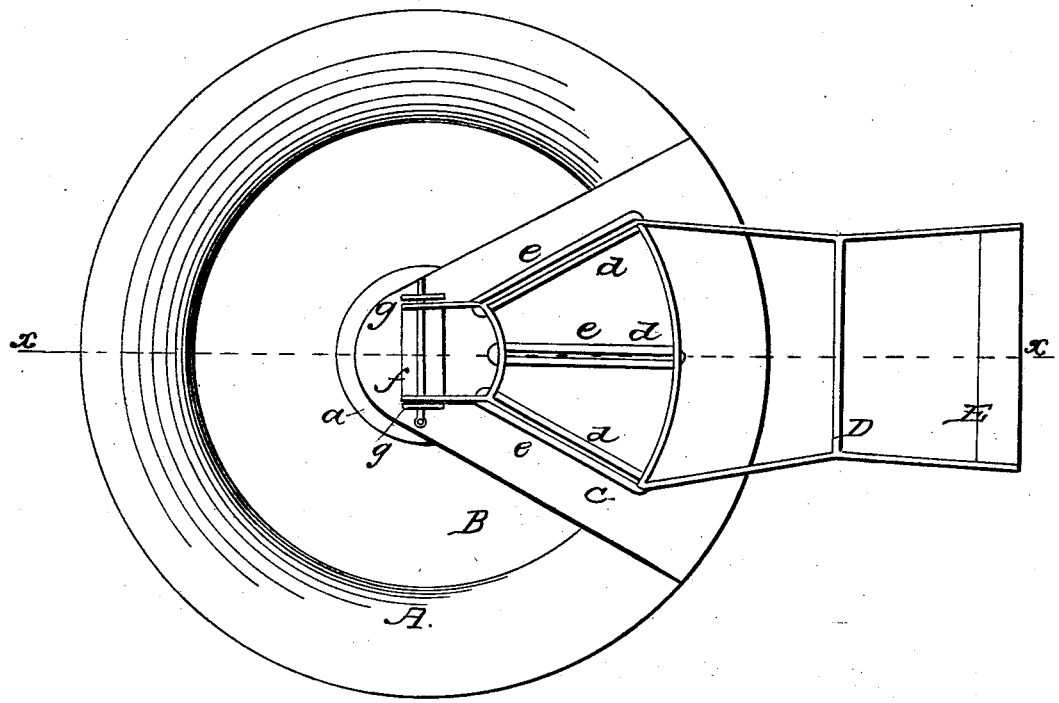
Figure 2:
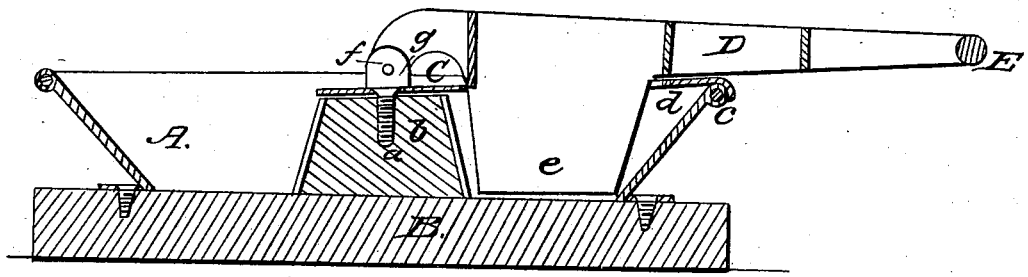

Figure 1, is a plan or top view of my invention; Fig. 2, a side sectional view of the same taken in the line $x$, $x$, Fig. 1.

Similar letters of reference indicate corresponding parts in the two figures.

The object of this invention is to obtain a simple, efficient and economical implement for the purpose of chopping meat and vegetables in a small way for family use, the device being intended for the kitchen, to occupy but little space and to require but little labor to manipulate it.

The ordinary meat-cutting machines, so called, those which are quite small and are provided with cutters attached to a rotating shaft or disk, are objectionable for several reasons. In the first place they are expensive to construct, second they require considerable power to operate them, third they are not kept easily in proper repair, and fourth they do not cut the meat but rather tear it into small pieces and cause it to have a very uninviting appearance. By my invention it is believed that these difficulties are obviated.

To enable those skilled in the art to fully understand and construct my invention I will proceed to describe it.

A, represents a circular bowl or basin which may be of metal and secured to a proper base B, of wood, the base forming the bottom of the bowl as shown clearly in Fig. 2.

At the center of the base B, there is an upright $a$, to the upper end of which there is secured by a pivot or bolt $b$, a V-shaped horizontal plate C, the outer end of which is turned down over the rim $c$, of the bowl as shown in Fig. 2.

The plate C is allowed to turn freely on the pivot or bolt $b$, serving as a center and the rim $c$, forming a guide for the plate. The plate C, has radial slots $d$, made in it to allow knives $e$, to pass through one knife passing through each slot. The knives $e$ are attached to a frame D, which is secured by a bolt $f$, to uprights $g$, $g$, at the inner end of frame D. The outer end of frame D is provided with a handle E, and the frame in consequence of being attached to the plate C, by the bolt $f$, is allowed a rising and falling movement and in consequence of having the plate C, attached to the upper end of upright $a$, the frame is allowed a lateral movement.

The meat or vegetables to be cut is placed in the bowl A, and the operator grasps the handle E, and works it up and down and laterally, the plate C, moving with the frame during the latter movement. The knives $e$, as they descend cut the meat or vegetables all around the bowl, as the knives $e$, may be moved all around it. The plate C, prevents the meat or vegetables following the knives upward the plate serving as a scraper.

If desired the bowl A, need not be a complete circle; it may be of semicircular form and answer a good purpose.

Whenever the base B, becomes much cut or scored by use a new one may be attached without any difficulty. Any hard wood would be suitable for a base.

Having thus described my invention, what I claim as new and desire to secure by Letters Patent, is—

1. The combination of the bowl A of circular or semicircular form and the radius knife-frame D, so applied as to admit of a rising and falling movement and also a lateral one, as and for the purpose set forth.

2. In combination with the bowl A, and knife frame D, the plate C, applied to the bowl and arranged relatively with the knife-frame D, to operate as and for the purpose set forth.

LEWIS S. CHICHESTER.

Witnesses:
B. GNOUXE,
M. M. LIVINGSTON.